(12) United States Patent
Kubota

(10) Patent No.: US 8,655,366 B2
(45) Date of Patent: Feb. 18, 2014

(54) RADIO BASE STATION AND INTERFERENCE EQUALIZATION METHOD IN MOBILE COMMUNICATION SYSTEM

(75) Inventor: Mitsuhiro Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 13/203,740

(22) PCT Filed: Feb. 23, 2010

(86) PCT No.: PCT/JP2010/001174
§ 371 (c)(1),
(2), (4) Date: Aug. 29, 2011

(87) PCT Pub. No.: WO2010/100857
PCT Pub. Date: Sep. 10, 2010

(65) Prior Publication Data
US 2011/0312327 A1    Dec. 22, 2011

(30) Foreign Application Priority Data

Mar. 2, 2009   (JP) ................................ 2009-048085

(51) Int. Cl.
*H04W 36/00* (2009.01)
(52) U.S. Cl.
USPC ........................... 455/436; 455/438; 370/331
(58) Field of Classification Search
None
See application file for complete search history.

(56) References Cited

U.S. PATENT DOCUMENTS

2002/0068571 A1*   6/2002  Ohlsson et al. ............... 455/442
2012/0294149 A1*  11/2012  Kazmi et al. .................. 370/235

FOREIGN PATENT DOCUMENTS

| | | |
|---|---|---|
| CN | 1398076 A | 2/2003 |
| JP | 2005-244906 A | 9/2005 |
| JP | 2006246537 A | 9/2006 |
| JP | 2007-295318 A | 11/2007 |
| JP | 2008092376 A | 4/2008 |
| JP | 2008167304 A | 7/2008 |
| JP | 2009044397 A | 2/2009 |
| JP | 2010-50852 A | 3/2010 |
| WO | 2005002270 A | 1/2005 |
| WO | 2005041609 A | 5/2005 |
| WO | 2007/126352 A1 | 11/2007 |
| WO | 2008072286 A | 6/2008 |

OTHER PUBLICATIONS

International Search Report for PCT/JP2010/001174 mailed May 18, 2010.
3GPP TS 36.331 V8.4.0, Technical Specification Group Radio Access Network: Evolved Universal Terrestrial Radio Access (E-UTRA) Radio Resource Control (RRC), Protocol specification (Release 8), Dec. 2008.

(Continued)

*Primary Examiner* — German J Viana di Prisco

(57) ABSTRACT

In a mobile communication system, an interference equalization method is installed in a radio base station for managing a cell configured of sectors, thus equalizing interference between sectors in uplink communication and improving sector-user throughputs. In the situation that congestion occurs in a second sector adjacent to a first sector, a handover from the second sector to the first sector is accelerated when uplink interference of the first sector is equal to or above a first threshold while the usage rate of resource blocks in the first sector is equal to or below a second threshold. This accelerates a handover from the second sector undergoing congestion to the first sector having available resource blocks, thus equalizing uplink interference between these sectors.

10 Claims, 9 Drawing Sheets

(56) References Cited

OTHER PUBLICATIONS

3GPP TS 36.423 V8.4.0. Technical Specification Group Radio Access Network; Evolved Universal Terrestrial Radio Access (E-UTRA); X2 application protocol (X2AP) (Release 8), Dec. 2008.

Japanese Notice of Allowance for JP Application No. 2011-502623 mailed on May 28, 2013 with English Translation.

Chinese Office Action for CN Application No. 201080010212.8 issued on Sep. 3, 2013 with English Translation.

\* cited by examiner

RADIO BASE STATION AND INTERFERENCE EQUALIZATION METHOD IN MOBILE COMMUNICATION SYSTEM

TECHNICAL FIELD

The present invention relates to mobile communication systems for conducting communication between mobile terminals by way of radio base stations managing cells configured of sectors, and in particular to radio base stations equalizing interference between sectors in uplink communication.

The present application claims priority on Japanese Patent Application No. 2009-48085 filed Mar. 2, 2009, the entire content of which is incorporated herein by reference.

BACKGROUND ART

Various technologies and standards have been developed with regard to mobile terminals and mobile communication systems (see Patent Documents 1-3, Non-Patent Documents 1-2).

The next-generation (3.9G) mobile communication standard, known as LTE (Long Term Evolution), prescribes a radio access method in which uplink communication employs a single carrier frequency division multiple access method (SC-FDMA: Single Carrier (SC)-Frequency Division Multiple Access) while downlink communication employs an orthogonal frequency division multiple access method (OFDMA: Orthogonal Frequency Division Multiple Access).

The OFDMA method employed in downlink communication is a digital modulation-demodulation method which multiplexes a plurality of carriers, called subcarriers, by use of orthogonality of frequency. The OFDMA method is superior in resistance to fading and multi-path interference.

On the other hand, the SC-FDMA method employed in uplink communication is similar to the OFDMA method but different from the OFDMA method in terms of the persistency of carriers allocated to users. Compared to the OFDMA method, the SC-FDMA method is expected to improve power efficiency. In the LTE standard, radio resources in uplink communication are divided with respect to a frequency axis and a time axis, so that divided radio resources are allocated to users.

The LTE standard prescribes that a mobile terminal issues a reception intensity measurement report so as to trigger handover. The LTE standard defines Events A1-A5 as reception intensity measurement reports with regard to the same frequency. In particular, a mobile terminal transmits a report of Event A3 triggering handover when the reception intensity of a neighboring sector, measured by the mobile terminal, exceeds the reception intensity of a sector currently conducting communication. The 3GPP standardization organization (see Non-Patent Document 1) prescribes that a report of Event A3 be transmitted in accordance with the following conditional expression.

$$Mn+Ofn+Ocn-Hys>Ms+Ofs+Ocs+Off$$

where parameters are defined as follows.

Mn: Reception intensity of a neighboring sector
Ofn: Offset value regarding the frequency band utilized by a mobile terminal
Ocn: Offset value regarding the neighboring sector
Ocs: Offset value regarding a sector currently conducting communication
Hys: Hysteresis
Off: Offset value inherent in Event A3

The conditional expression is easily satisfied when the offset value Ocn of a neighboring sector increases. In contrast, the conditional expression is hardly satisfied when the offset value Ocn decreases. This makes it possible to accelerate or prevent communication handover with a mobile terminal between sectors by changing the offset value Ocn. In this connection, a mobile terminal is notified of a change of the offset value by way of sector notification information of a radio base station or an individual control signal.

PRIOR ART DOCUMENT

Patent Document

Patent Document 1: Japanese Patent Application Publication No. 2006-246537
Patent Document 2: International Publication No. WO 2005/002270
Patent Document 3: International Publication No. WO 2005/041609

Non-Patent Document

Non-Patent Document 1: 3GPP TS 36.331 V8.4.0 Radio Resource Control (RRC)
Non-Patent Document 2: 3GPP TS 36.423 V8.4.0 X2 Application Protocol (X2AP)

SUMMARY OF THE INVENTION

Problem to be Solved by the Invention

The LTE standard prescribes that a radio base station allocates radio resources to a mobile terminal in uplink/downlink communication. FIG. 11 shows the relationship between a radio frame, slots, and resource blocks (RB: Resource Block) according to the LTE standard. One resource block is composed of twelve subcarriers and seven symbols. A CP (Cyclic Prefix) serves as a guard interval added to each symbol. One-hundred resource blocks are available in a 20 MHz communication band; fifty resource blocks are available in a 10 MHz communication band; and twenty-five resource blocks are available in a 5 MHz communication band.

The LTE standard adopts the same frequency with regard to all sectors in uplink communication. A radio base station allocates resource blocks, which are divided with respect to a frequency axis and a time axis, to mobile terminals. Independent resource blocks are allocated to mobile terminals in each sector. No uplink interference occurs in each sector in which the same resource block is not repeatedly allocated to a plurality of mobile terminals.

Interference may occur between sectors, however, when a resource block used in one sector is utilized in another adjacent sector at the same timing. The occurrence of interference between sectors may degrade "SINK (Signal to Interference and Noise Power Ratio)" of received signals. For this reason, radio base stations are unable to adopt a high-degree modulation method such as 16QAM enabling high-speed communication with mobile terminals, thus degrading a user throughput in uplink communication of mobile terminals. Under such circumstances, it is requested to provide a countermeasure for reducing interference between sectors in uplink communication according to the LTE standard.

To cope with this request, ICIC (Inter-Cell Interference Coordination) has been considered. The 3GPP standardization organization (see Non-Patent Document 2) prescribes that each radio base station is able to notify its neighboring radio base station of information, regarding intensity of uplink interference in each resource block. Based on this information, each radio base station notifies its neighboring radio base station to refrain from allocating resource blocks, causing high uplink interference, thus preventing the occurrence of uplink interference.

In this method, when a specific sector is notified of intensity of uplink interference by a neighboring sector adjacent thereto while the number of mobile terminals (or users) connected thereto increases, the specific sector, connected with the increasing number of mobile terminals, undergoes a reduction of resource blocks available therein. As a result, a sector throughput in uplink communication must be decreased.

Mobile terminals located in the periphery of each sector are susceptible to a negative influence due to the decreasing number of available resource blocks. For this reason, each of mobile terminals located in the periphery of each sector undergoes a reduction of a user throughput in uplink communication.

Means for Solving the Problem

The present invention is provided to solve this problem and characterized in that a radio base station is equipped with a mechanism which equalizes interference between sectors in uplink communication so as to improve a throughput in uplink communication.

The present invention is directed to a radio base station for managing cells configured of sectors in a mobile communication system, which accelerates a handover from a second sector, adjacent to a first sector, to the first sector so as to equalize uplink interference between the first sector and the second sector when the uplink interference of the first sector is equal to or above a first threshold while a usage rate of resource blocks in the first sector is equal to or less than a second threshold.

The present invention is directed to a mobile communication system including a core network, a plurality of mobile terminals, and a plurality of radio base stations, wherein each radio base station is able to equalize uplink interference between a first sector and a second sector.

The present invention is directed to an interference equalization method applied to a radio base station for managing cells configured of sectors in a mobile communication system, wherein a decision is made as to whether or not uplink interference of a first sector is equal to or above a first threshold while a usage rate of resource blocks in the first sector is equal to or less than a second threshold, thus accelerating a handover from a second sector, adjacent to the first sector, to the first sector by changing a handover threshold.

The present invention is directed to a program, prescribing the interference equalization method, which is executed by a computer.

Effect of the Invention

The present invention accelerates a handover from a sector undergoing congestion to a neighboring sector with high uplink interference and a low usage rate of resource blocks, thus equalizing uplink interference between mutually adjacent sectors and improving sector/user throughputs in uplink communication.

MODE FOR CARRYING OUT THE INVENTION

Figure 1:
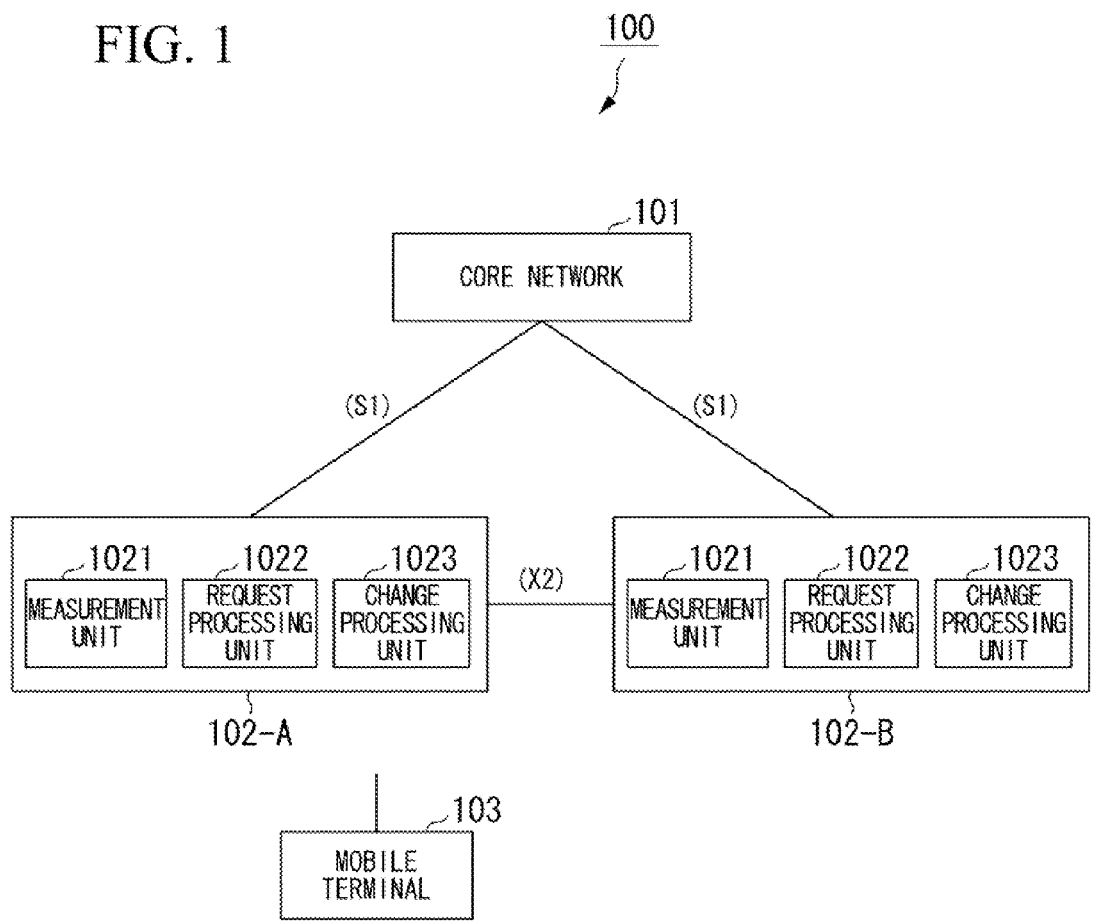
FIG. 1 A block diagram showing the constitution of a mobile communication system 100 according to a preferred embodiment of the present invention based on the LTE standard.

FIG. 1 is a block diagram showing the constitution of a mobile communication system 100 according to a preferred embodiment of the present invention based on the LTE standard. The mobile communication system 100 includes a core network 101, radio base stations 102, and a mobile terminal 103. FIG. 1 shows two radio base stations 102-A, 102-B; but the number of radio base stations is not necessarily limited to two and is arbitrarily determined.

The core network 101 is connected to the radio base stations 102-A, 102-B via an S1 interface so as to carry out data transmission and data reception. The radio base stations 102-A, 102-B are located to adjoin each other and mutually connected via an interface X2. That is, the radio base stations 102-A, 102-B exchange messages therebetween via the interface X2.

The radio base station 102 manages a cell configured of sectors, so that the radio base station 102 is able to wirelessly perform data transmission and data reception with the mobile terminal 103 located in the cell.

Figure 2:
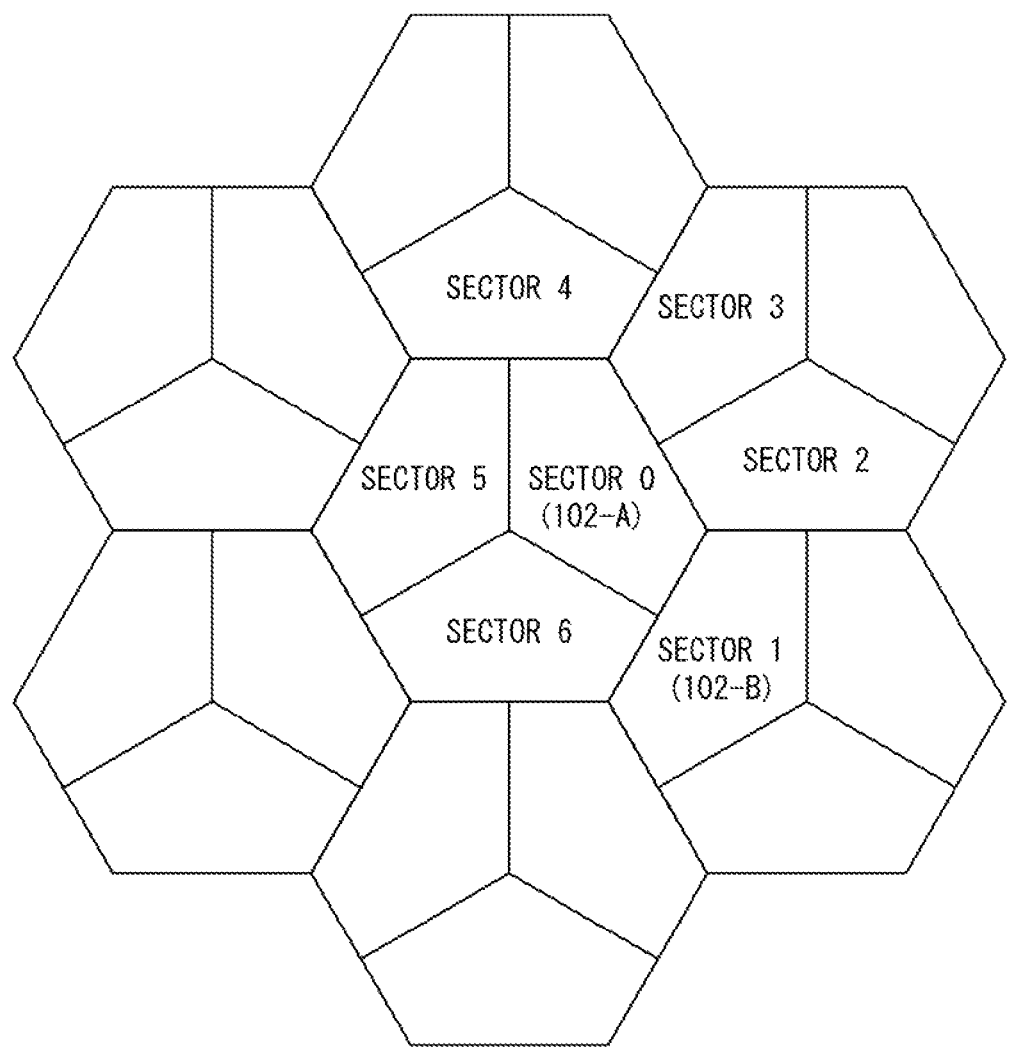
FIG. 2 An illustration of a sector configuration of cells managed by a radio base station included in the mobile communication system.

FIG. 2 shows an exemplary layout of sectors included in the cell managed by the radio base station 102. In the present embodiment, one cell is divided into three sectors. For the sake of convenience, the radio base station 102-A manages a cell including sector 0 whilst the radio base station 102-B manages a cell including sector 1 adjacent to sector 0.

The radio base station 102-A includes a measurement unit 1021, a request processing unit 1022, and a change processing unit 1023 to achieve an interference equalizing function. Herein, the measurement unit 1021 measures uplink interference (i.e. the amount of interference which each sector undergoes via its neighboring sector) and a usage rate of resource blocks in each sector. The request processing unit 1022 periodically performs a task of making a request for changing a handover threshold based on the measurement result of the measurement unit 1021. The change processing unit 1023 periodically performs a handover threshold change (update) process in response to the change request. Similarly, the radio base station 102-B includes the measurement unit 1021, the request processing unit 1022, and the change processing unit 1023.

The present embodiment adopts "IoT (Interference [sic] over Thermal)" as an indicator of uplink interference which each sector undergoes via its neighboring sector; but this is not a restriction. For instance, it is possible to employ "SINR (Signal to Interference [sic] and Noise Power Ratio)".

FIG. 1 shows constituent elements essential for describing the present embodiment alone, but the mobile communication system 100 further includes known functions and constituent elements in addition to the foregoing constituent elements.

Next, an interference equalization method of the present embodiment will be described with reference to the mobile communication system 100.

The following description is made on the precondition that a plurality of mobile terminals (or users) concentrates at sector 0, which is thus placed in a congested state in wireless communication, in the sector configuration shown in FIG. 2. Sector 1, sector 2, sector 3, sector 4, sector 5, and sector 6 exist to adjoin sector 0. Herein, sector 1 undergoes increasing uplink interference caused by sector 0.

The present embodiment is described such that sector 0 and sector 1 belong to different cells; but this is not a restriction. That is, both of sector 0 and sector 1 may belong to the same cell.

An operating principle of an interference equalization method will be described before describing the operation of the present embodiment.

In sectors 0 and 1 mutually adjacent to each other, a usage rate of resource blocks increases as the number of mobile terminals (or users) conducting radio communication in sector 0 increases. This increases uplink interference from sector 0 to sector 1 while decreasing a throughput in sector 1.

Uplink interference between sectors 0 and 1 is equalized when a mobile terminal moves from sector 0, undergoing an increasing usage rate of resource blocks, to sector 1. This reduces uplink interference in sector 1 so as to improve a throughput in sector 1. In other words, a throughput of sector 1, undergoing increasing uplink interference, can be improved if mobile terminals located in sector 0, causing increasing uplink interference, are moved to sector 1 so that interference between sectors 0 and 1 can be equalized.

For this reason, the radio base stations 102-A, 102-B change handover thresholds in sectors so as to accelerate a handover from sector 0 to sector 1 on the condition that uplink interference caused by sector 0 is equal to or above a first threshold a, and a usage rate of resource blocks in sector 1 is equal to or less than a second threshold b, thus equalizing interference between sectors. Besides improving a sector throughput of uplink communication in sector 1, this interference equalization enables a mobile terminal, located in the periphery of sector 0, to perform radio communication using a large number of resource blocks in sector 1, which is a destination of the mobile terminal, thus improving a user throughput of uplink communication in sector 1.

Next, interference equalization of the mobile communication system 100 will be described in detail with reference to FIGS. 3 to 6.

Figure 3:
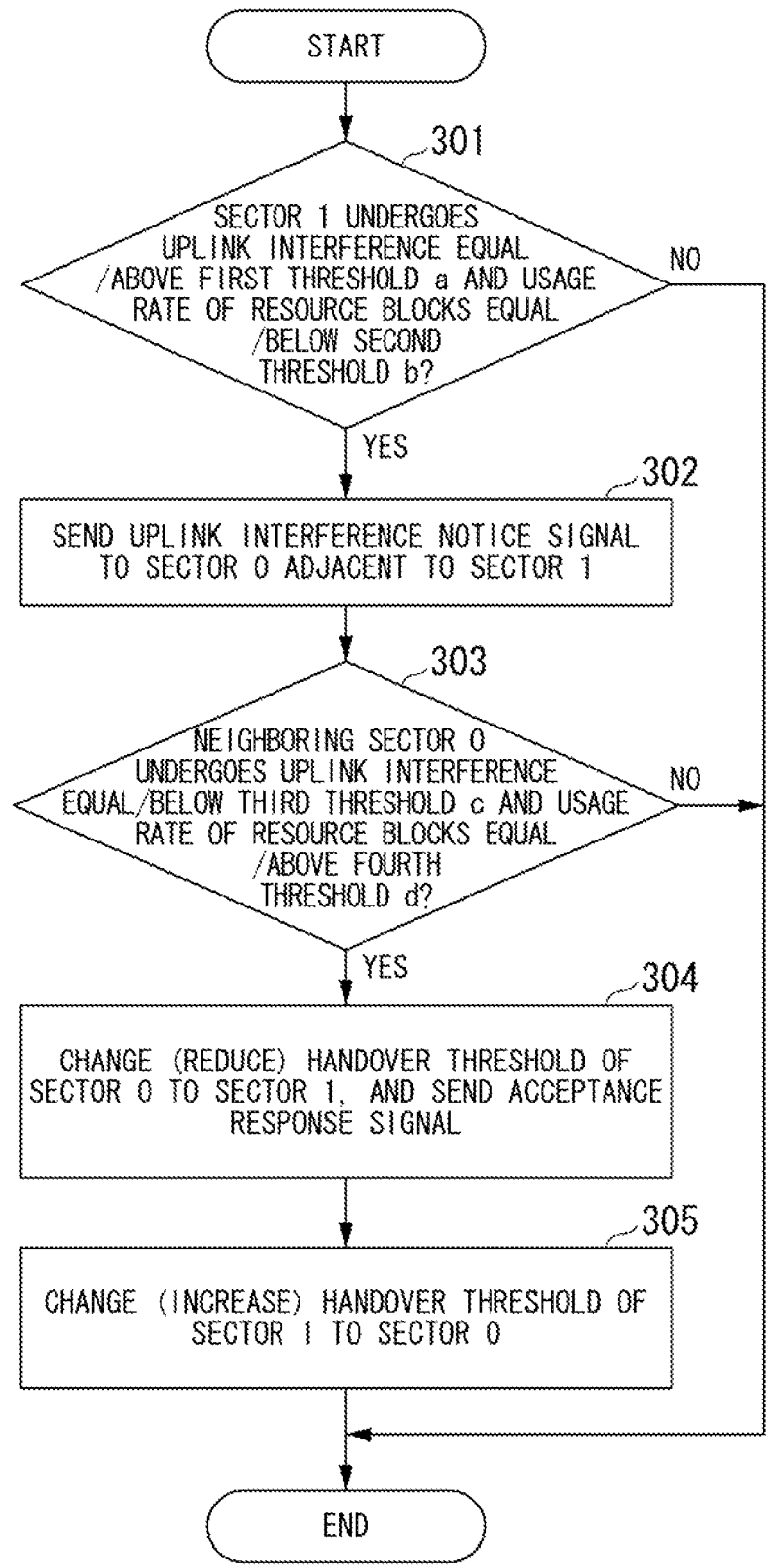
FIG. 3 A flowchart of a handover threshold change process involved in interference equalization implemented by the embodiment.
Figure 4:
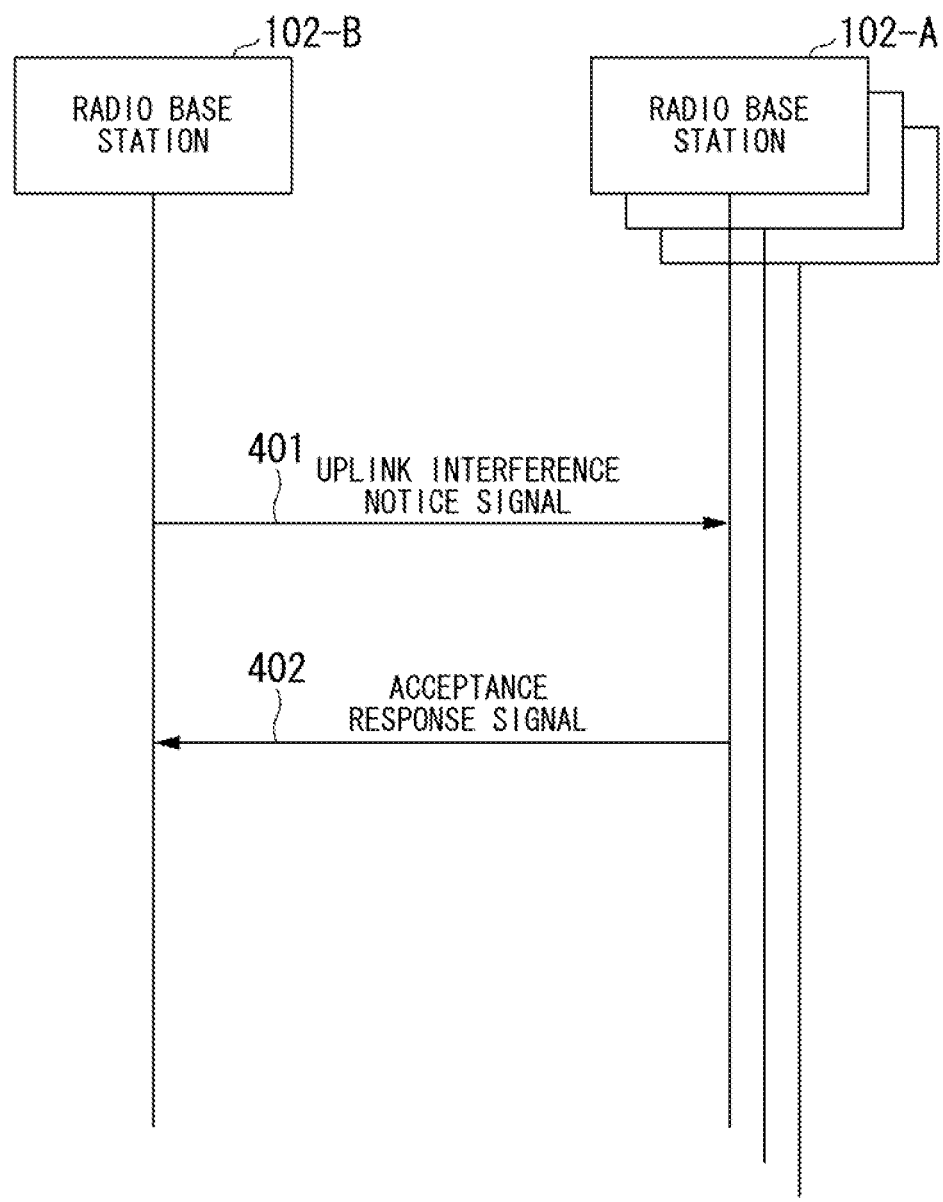
FIG. 4 A schematic diagram of a communication sequence conducted between radio base stations in the handover threshold change process.
Figure 5:
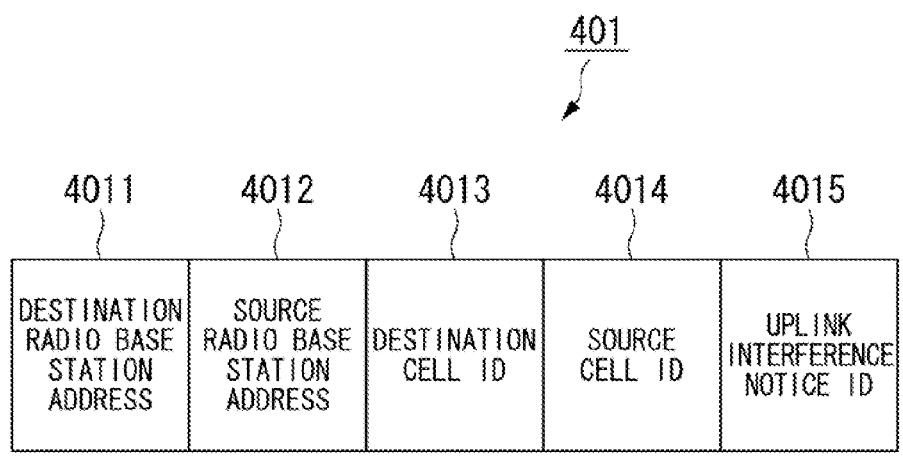
FIG. 5 A schematic diagram showing the configuration of an uplink interference notice signal transmitted between radio base stations in the handover threshold change process.
Figure 6:
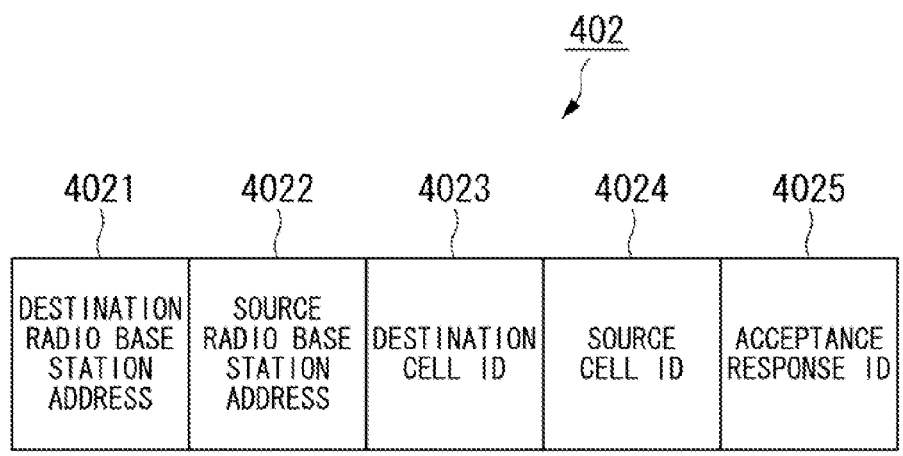
FIG. 6 A schematic diagram showing the configuration of an acceptance response signal transmitted between radio base stations in the handover threshold change process.

FIG. 3 is a flowchart of a handover threshold change process involved in interference equalization. FIG. 4 shows a communication sequence between the radio base stations 102 in the handover threshold change process. FIG. 5 shows the configuration of an uplink interference notice signal 401 transmitted between the radio base stations 102 in the handover threshold change process. FIG. 6 shows the configuration of an acceptance response signal 402 transmitted between the radio base stations 102 in the handover threshold change process.

The uplink interference notice signal 402 of FIG. 5 includes a destination radio base station address 4011, a source radio base station address 4012, a destination cell ID 4013, a source cell ID 4014, and an uplink interference notice ID 4015. The acceptance response signal 402 of FIG. 6 includes a destination radio base station address 4021, a source radio base station address 4022, a destination cell ID 4023, a source cell ID 4024, and an acceptance response ID 4025.

When uplink interference of sector 1 increases due to the increasing number of mobile terminals conducting radio communication in sector 0, the measurement unit 1021 of the radio base station 102-B managing sector 1 measures uplink interference (IoT) caused by sector 0, adjacent to sector 1, and a usage rate of resource blocks in sector 1. The request processing unit 1022 makes a decision as to whether or not uplink interference (IoT) of sector 1 is equal to or above the first threshold a while the usage rate of resource blocks is equal to or less than the second threshold b (step 301).

When the decision result of step 301 is "YES", the request processing unit 1022 of the radio base station 102-B sends the uplink interference notice signal 401 to the radio base stations 102 (e.g. the radio base station 102-A managing sector 0) managing all sectors adjacent to sector 1 (see FIG. 4), thus requesting a change of a handover threshold in each neighboring sector (step 302).

Upon receiving the uplink interference notice signal 401, the measurement unit 1021 of the radio base station 102-A measures uplink interference (IoT) and a usage rate of resource blocks in sector 0. The request processing unit 1022 makes a decision as to whether or not uplink interference (IoT) is equal to or less than a third threshold c while a usage rate of resource blocks is equal to or above a fourth threshold d in sector 0 (step S303). When the decision result of step 303 is "YES", the radio base station 102-A sends back the acceptance response signal 402, representing an acceptability of a change request of a handover threshold, to the radio base station 102-B (see FIG. 4). Upon transmitting the acceptance response signal 402, the radio base station 102-A simultaneously increases the offset value of sector 0 to sector 1, thus decreasing a handover threshold from sector 0 to sector 1 (step 304).

The present embodiment determines the following relationship between the first threshold a and the second threshold b, which are used for making a decision as to whether to request a change of a handover threshold, as well as the third threshold c and the fourth threshold d, which are used for making a decision as to whether to accept a change of a handover threshold.

First threshold a>Third threshold c

Second threshold b<Fourth threshold d

It is possible to effectively perform interference equalization between sectors and improve throughputs by setting the thresholds a to d in accordance with this relationship. The method of setting thresholds is not limited to this method; hence, it is possible to appropriately set thresholds in light of interference equalization between sectors and improvement of throughputs.

Next, upon receiving the acceptance response signal 402, the change processing unit 1023 of the radio base station 102-B decreases the offset value of sector 1 to sector 0. That is, the radio base station 102-B receiving the acceptance response signal 402 increases a handover threshold from sector 1 to sector 0 (step 305).

By changing handover thresholds in sectors 0 and 1, it is possible to accelerate a handover from sector 0 to sector 1 whilst it is possible to prevent a handover from sector 1 to sector 0. That is, it is possible to prevent a handover from being frequently carried out between sectors 0 and 1.

Upon receiving the acceptance response signal 402 from the radio base station 102 managing sectors other than sector 0, the radio base station 102-B decreases the offset value to the sector sending back an acceptance response to sector 1 while increasing a handover threshold from sector 1 to the sector. Thus, it is possible to prevent a handover from being frequently carried out between adjacent sectors.

Next, the handover threshold change process, including steps 301 to 305, will be demonstrated in light of communication conducted between the radio base stations 102-A and 102-B with reference to FIG. 4.

The radio base station 102-B monitors uplink interference and a usage rate of resource blocks with respect to sector 1 in the cell managed by itself. The radio base station 102-B sends the uplink interference notice signal 401 to the radio base station 102 (e.g. the radio base station 102-A) managing the neighboring sector via the interface X2 when the uplink interference and the usage rate of resource blocks satisfy the predetermined condition (i.e. the predetermined condition for issuing a change request of a handover threshold).

Upon receiving the uplink interference notice signal 401, the radio base station 102 (e.g. the radio base station 102-A) confirms the uplink interference and the usage rate of resource blocks in the neighboring sector adjacent to sector 1 in the cell managed by itself. The radio base station 102 sends the acceptance response signal 402 to the radio base station 102-B when both the uplink interference and the usage rate of resource blocks satisfy the predetermined condition (i.e. the predetermined condition for accepting a change request of a handover threshold). As described above, communication is made between the radio base stations 102 adjacent to each other, so that handover thresholds are changed with respect to neighboring sectors included in cells managed by the radio base stations 102.

Next, a handover threshold change reset process involved in interference equalization will be described with reference to FIGS. 7 to 9.

Figure 7:
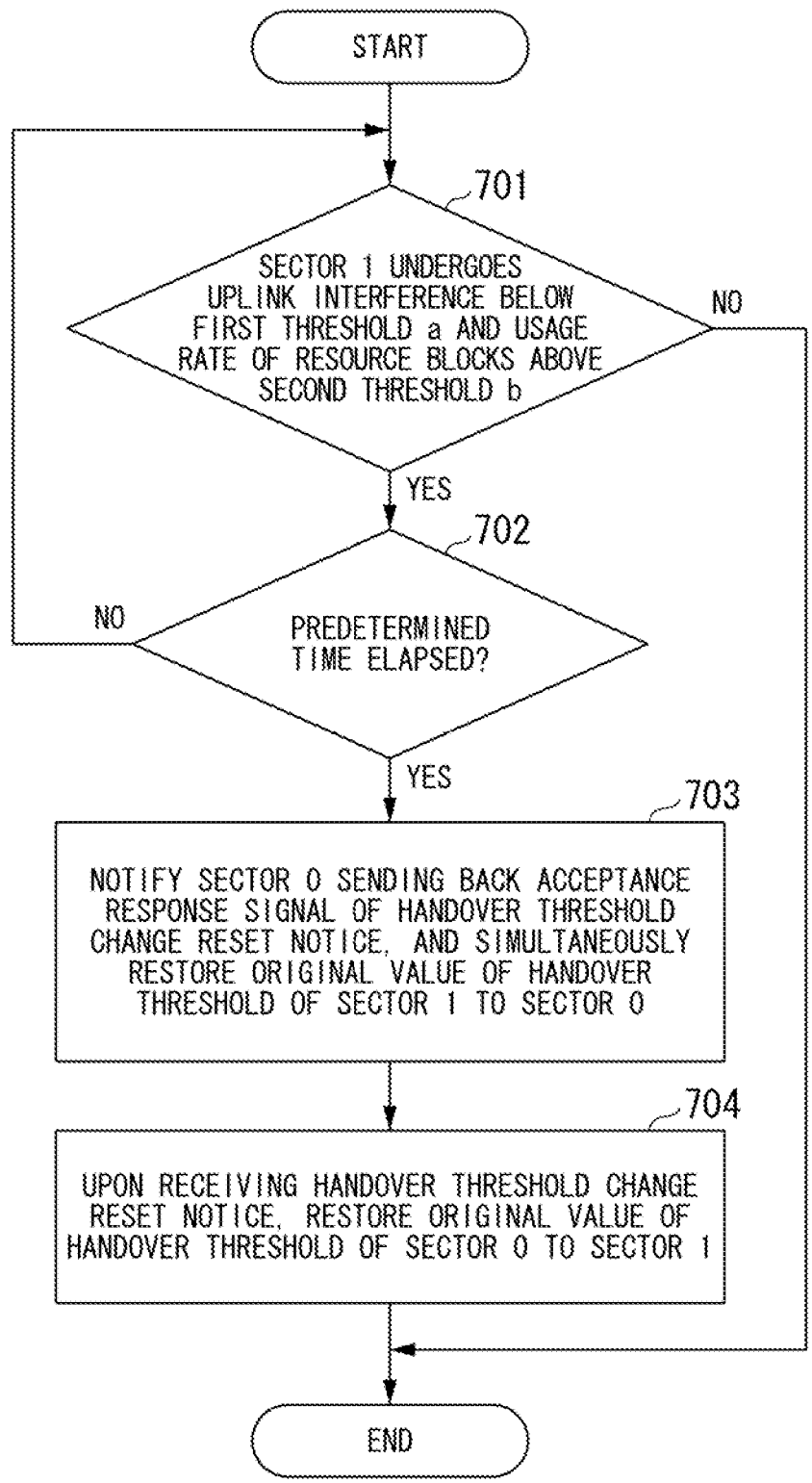
FIG. 7 A flowchart of a handover threshold change reset process in interference equalization implemented by the embodiment.
Figure 8:
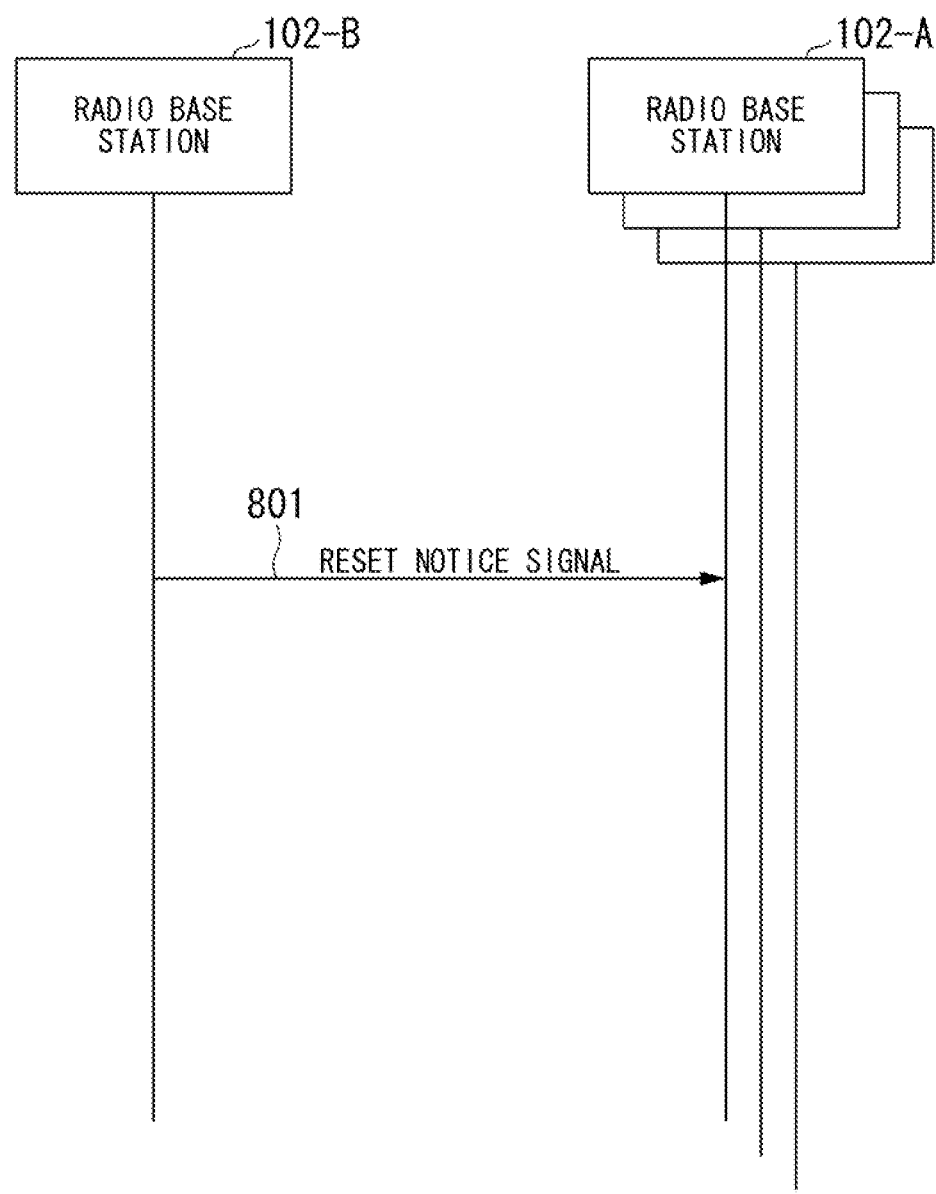
FIG. 8 A schematic diagram of a communication sequence conducted between radio base stations in the handover threshold change reset process.

FIG. 7 is a flowchart of the handover threshold change rest process. FIG. 8 shows a communication sequence between the radio base stations 102 in the handover threshold change reset process. FIG. 9 shows the configuration of a reset notice signal 801 transmitted between the radio base stations 102 in the handover threshold change reset process.

Figure 9:
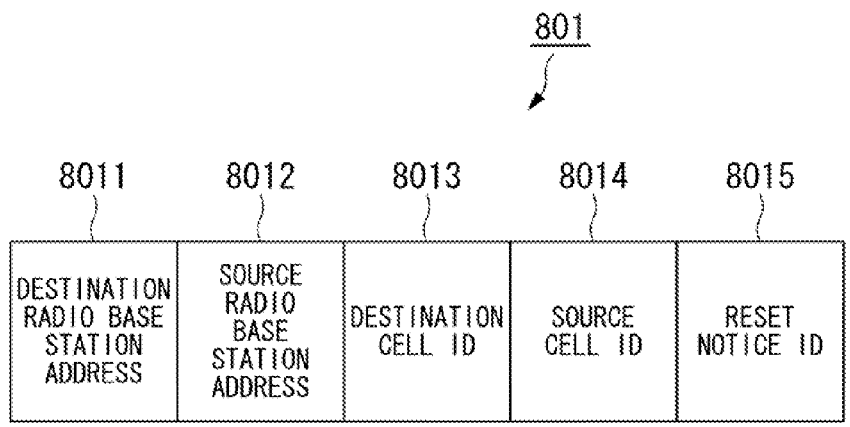
FIG. 9 A schematic diagram showing the configuration of a reset notice signal transmitted between radio base stations in the handover threshold change reset process.

The reset notice signal 801 of FIG. 9 includes a destination radio base station address 8011, a source radio base station address 8012, a destination cell ID 8013, a source cell ID 8014, and a reset notice ID 8015.

After changing handover thresholds by way of a series of steps involved in interference equalization, the radio base station 102-B managing sector 1 periodically measures uplink interference (IoT) and a usage rate of resource blocks in sector 1 so as to make a decision on the measurement result (step 701). That is, the decision result of step 701 turns to "YES" when uplink interference (IoT) of sector 1 is less than the first threshold a, or the usage rate of resource blocks is higher than the second threshold b. Additionally, the decision result of step 702 turns to "YES" when this state is sustained for more than a predetermined time. In this case, the radio base station 102-B sends the reset notice signal 801, indicating a handover threshold change reset, to the radio base station 102 (e.g. the radio base station 102-A managing sector 0) managing the neighboring sector sending back the acceptance response signal 402 (step 703).

Besides sending the reset notice signal 801, the radio base station 102-B restores the original offset value of sector 1 with respect to the radio base station 102 (e.g. the radio base station 102-A managing sector 0) managing the neighboring sector (step 703). In other words, the radio base station 102-B restores the original value of the handover threshold of sector 1 with respect to the neighboring sector (e.g. sector 0 managed by the radio base station 102-A) managed by the radio base station 102 sending back the acceptance response signal 402.

Upon receiving the reset notice signal 801, the radio base station 102-A restores the original offset value of sector 0 with respect to sector 1 which is a source of transmitting the reset notice signal 801 (step 704). That is, the radio base station 102-A restores the original value of the handover threshold of sector 0 with respect to sector 1.

In this situation, when the offset values of sectors 0 and 1, i.e. handover thresholds, are changed due to a rapid change of the uplink interference (IoT) and a rapid change of the usage rate of resource blocks in sectors 0 and 1, the radio base station 102-A (sector 0) sends the uplink interference notice signal 401 to the radio base station 102-B (sector 1), so that the radio base station 102-B may send back the acceptance response signal 402 to the radio base station 102-A. This causes a phenomenon reverse to the communication sequence shown in FIG. 4. In this case, a change of the offset value (or the handover threshold) in the radio base station 102-B (sector 1) is canceled; thereafter, the radio base station 102-A (sector 0) performs measurement and decision on uplink interference (IoT) and the usage rage of resource blocks.

Figure 10:
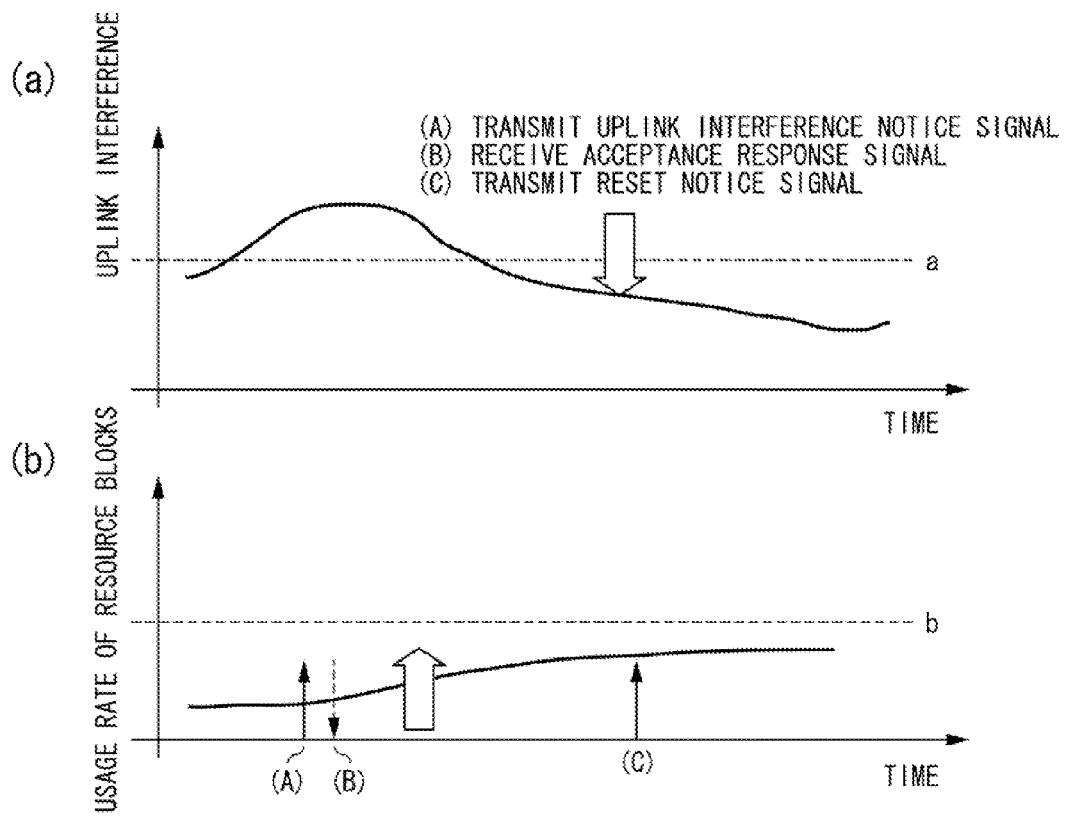
FIG. 10 (*a*) A graph showing time-variant uplink interference in a predetermined sector, (*b*) a graph showing a time-variant usage rate of resource blocks in a predetermined sector.
Figure 11:
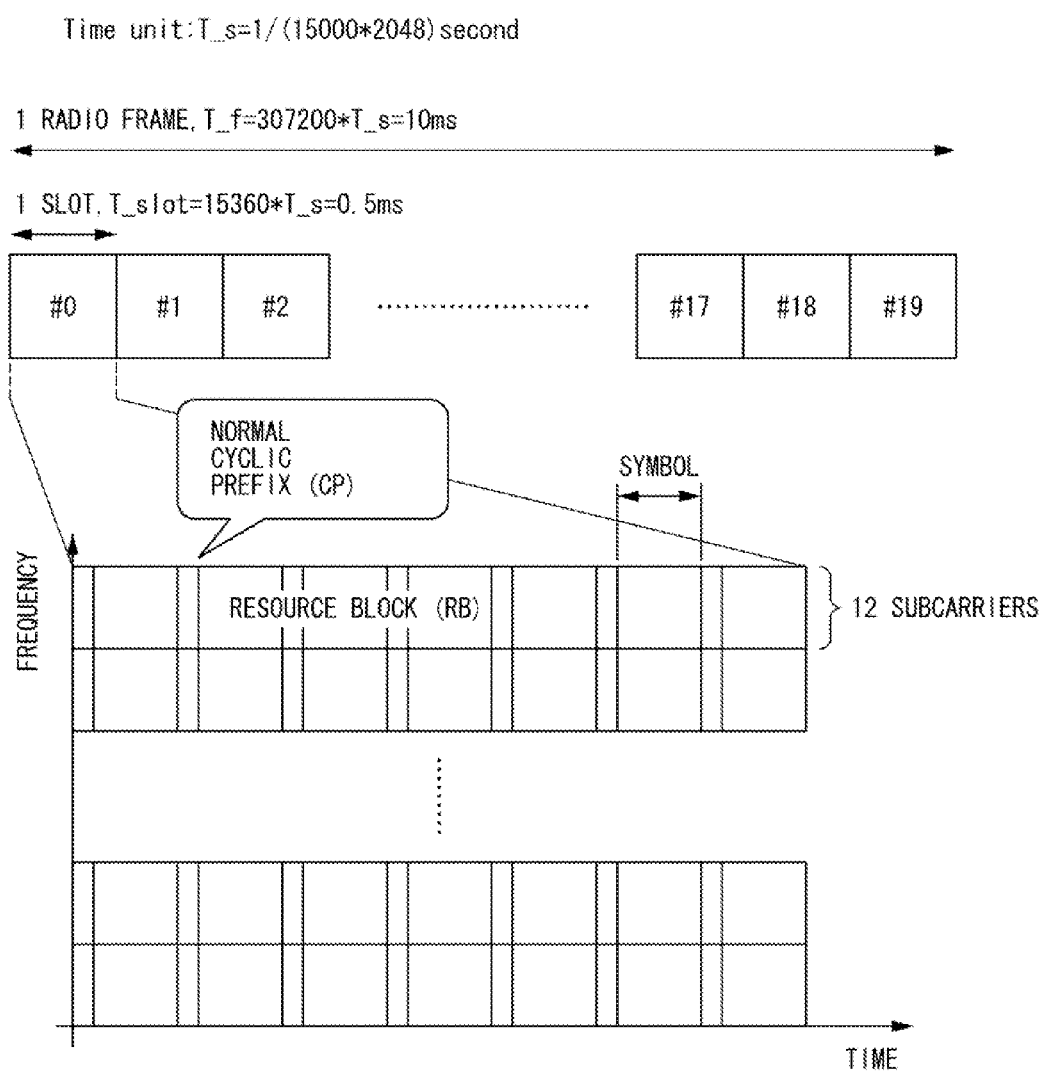
FIG. 11 A schematic diagram showing the relationship between a radio frame, slots, and resource blocks according to the LTE standard.

Next, interference equalization of the present invention will be summarized in view of sector 1 with reference to FIG. 10. FIG. 10 includes graphs indicating time-variant uplink interference and a time-variant usage rate of resource blocks in sector 1.

First, uplink interference increases in sector 1, adjacent to sector 0, as the number of mobile terminals (or users) conducting radio communication in sector 0 increases. The radio base station 102-B transmits the uplink interference notice signal 401 when uplink interference of sector 1 exceeds the first threshold a ((A) in FIG. 10). Upon receiving the uplink interference notice signal 401, the radio base station 102-A decreases the handover threshold in sector 0 and transmits the acceptance response signal 402 to the radio base station 102-B ((B) in FIG. 10). This accelerates radio communication of a mobile terminal from sector 0 to sector 1, thus equalizing interference between sectors 0 and 1. That is, an uplink throughput increases as uplink interference decreases in sector 1. Thereafter, the radio base station 102-B restores the original value of the handover threshold as uplink interference decreases while the usage rate of resource blocks increases; additionally, the radio base station 102-B sends the reset notice signal 801 to the radio base station 102-A ((C) in FIG. 10).

Uplink interference of sector 0 increases when mobile terminals partly move from sector 0 to sector 1 owing to accelerated handover of radio communication from sector 0 to sector 1. In this case, if sector 0 undergoes a small increase of uplink interference, it is possible to increase the number of resource blocks available in sector 0 by the number of resource blocks allocated to mobile terminals moving from sector 0 to sector 1.

This increases the number of resource blocks allocable to mobile terminals in sector 0 after mobile stations partly move from sector 0 to sector 1. For this reason, an uplink sector throughput in sector 0 will be hardly varied even when uplink interference increases in sector 0. Thus, it is possible to increase the entire throughput in the mobile communication system 100. Additionally, it is possible to allocate a large number of resource blocks to a mobile terminal, originally located in the periphery of sector 0, in its destination, i.e. sector 1; hence, it is possible to increase an uplink user throughput in the mobile terminal.

The present embodiment demonstrates the following effects.

1. It is possible to equalize uplink interference between sectors.
2. It is possible to improve an uplink sector throughput in each sector.
3. It is possible to improve an uplink throughput of a mobile terminal located in the periphery of each sector.

Additionally, the present embodiment possesses the following features.

1. The first radio base station (102-B) sends an uplink interference notice signal to the second radio base station (102-A) managing the neighboring second sector (sector 0) when uplink interference is equal to or above the first threshold while the usage rate of resource blocks is equal to or below the second threshold in the first sector (sector 1).
2. Upon receiving the uplink interference notice signal, the second radio base station sends back an acceptance response signal when uplink interference is equal to or below the third threshold while the usage rage of resource blocks is equal to or above the fourth threshold in the second sector.
3. Additionally, the second radio base station changes handover thresholds to accelerate a handover of a mobile terminal from the second sector to the first sector when sending back the acceptance response signal.
4. Upon receiving the acceptance response signal, the first radio base station changes handover thresholds to prevent a handover from the first sector to the second sector.
5. The first radio base station sends a reset notice signal to the second radio base station to restore the original value of the handover threshold when uplink interference of the first sector is less than the first threshold or the usage rate of resource blocks becomes higher than the second threshold, and when this state is sustained for more than the predetermined time.
6. Besides sending the reset notice signal, the first radio base station restores the original value of the handover threshold in the sector 1.
7. Upon receiving the reset notice signal, the second radio base station restores the original value of the handover threshold.

The present embodiment applies the radio base station, having the interference equalization function, to the mobile communication system, whereas the radio base station can be reconfigured to implement a program, realizing the interference equalization method, on a computer.

The present invention is not necessarily limited to the present embodiment, which can be modified in various ways within the scope of the invention defined by the appended claims.

The present embodiment is designed such that sector 1, undergoing increasing uplink interference increased under influence of sector 0 undergoing an increasing amount of communication, issues a handover threshold change request so as to accelerate a handover from sector 0 to sector 1, whereas it is possible to modify the embodiment to accelerate a handover from sector 0 to another neighboring sector (e.g. sector 4). In this case, mutual communication needs to be performed between sector 0, sector 1, and sector 4, wherein it is necessary to adjust handover thresholds based on the uplink interference and the usage rate of resource blocks in these sectors, thus improving the entire throughput of the mobile communication system 100. For instance, it is necessary to increase handover thresholds from sector 1 to sector 0 while decreasing handover thresholds from sector 0 to sector 4. This prevents a handover from sector 1 to sector 0 while accelerating a handover from sector 0 to sector 4. Thus, it is possible to equalize uplink interference between sectors 0, 1, 4.

INDUSTRIAL APPLICABILITY

The present invention is applied to the mobile communication system including radio base stations managing cells configured of sectors and particularly applied to the next generation mobile communication standard, namely the LTE standard. Additionally, the present invention involves mutual communication conducted between radio base stations to equalize uplink interference between cells, thus improving the uplink cell throughput and the user throughput in mobile terminals.

DESCRIPTION OF THE REFERENCE NUMERALS

100 Mobile communication system
101 Core network
102 Radio base station
103 Mobile terminal
401 Uplink interference notice signal
402 Acceptance response signal
801 Reset notice signal

The invention claimed is:

1. A radio base station comprising:
a measurement unit that measures uplink interference and a usage rate of resource blocks;
a request processing unit that issues a change request of a handover threshold; and
a change processing unit that changes the handover threshold in response to the change request,
wherein the request processing unit issues the change request of the handover threshold when a first sector is assigned to uplink interference equal to or above a first threshold and a usage rate of resource blocks equal to or below a second threshold,
wherein, when a second sector, adjacent to the first sector, is assigned to uplink interference equal to or below a third threshold and a usage rate of resource blocks equal to or above a fourth threshold, the change processing unit changes the handover threshold to accelerate a handover from the second sector to the first sector, thus equalizing uplink interference between the first sector and the second sector, and
wherein after changing the handover threshold in response to the change request, the change processing unit resets the change request and restores an original value of the handover threshold when the uplink interference below the first threshold is sustained for more than a redetermined time or when the usage rate of resource blocks becomes higher than the second threshold.

2. The radio base station according to claim 1, wherein the first threshold is higher than the third threshold while the second threshold is lower than the fourth threshold.

3. The radio base station according to claim 1, wherein the measurement unit measures an IoT as the uplink interference.

4. The radio base station according to claim 1, wherein the measurement unit measures an SINR as the uplink interference.

5. A mobile communication system comprising:
a core network;
a plurality of mobile terminals; and
a first radio base station and a second radio base station assigned to a first sector and a second sector which are adjacently located,
wherein the first radio base station accelerates a handover from the second sector to the first sector when the first sector is assigned to uplink interference equal to or above a first threshold and a usage rate of resource blocks equal to or below a second threshold, thus equalizing uplink interference between the first sector and the second sector,
wherein each of the first radio base station and the second radio base station includes a measurement unit that measures uplink interference and an usage rate of resource blocks, a request processing unit that issues a change request of a handover threshold when the uplink interference is equal to or above the first threshold while the usage rate of resource blocks is equal to or below the second threshold, and a change processing unit changes the handover threshold in response to the change request when the uplink interference is equal to or below a third threshold while the usage rate of resource blocks is equal to or above a fourth threshold,
wherein the request processing unit of the first radio base station issues the change request of the handover threshold when the first sector is assigned to uplink interference equal to or above a first threshold and a usage rate of resource blocks equal to or below a second threshold,
wherein, when the second sector is assigned to uplink interference equal to or below a third threshold and a usage rate of resource blocks equal to or above a fourth threshold, the change processing unit of the second radio base station changes the handover threshold in response to the change request of the first radio base station so as to accelerate a handover from the second sector to the first sector, and
wherein after changing the handover threshold in response to the change request, the change processing unit resets the change request and restores an original value of the handover threshold when the uplink interference below the first threshold is sustained for more than a predetermined time or when the usage rate of resource blocks becomes higher than the second threshold.

6. An interference equalization method adapted to a mobile communication system including a first radio base station and a second radio base station assigned to a first sector and a second sector which are located adjacent, said interference equalization method comprising:
determining whether or not the first sector is assigned to uplink interference equal to or above a first threshold and a usage rate of resource blocks equal to or below a second threshold;
changing a handover threshold to accelerate a handover from the second sector to the first sector;
within the first radio base station, measuring uplink interference and a usage rate of resource blocks in the first sector;
issuing a change request of a handover threshold in the second sector when the first sector is assigned to uplink interference equal to or above the first threshold and the usage rate of resource blocks equal to or below the second threshold;
within the second radio base station, measuring uplink interference and an usage rate of resource blocks in the second sector;
decreasing a first handover threshold from the second sector to the first sector in response to the change request of the first radio base station when the second sector is assigned to uplink interference equal to or below a third threshold and the usage rate of resource blocks equal to or above a fourth threshold;
within the first radio base station, increasing a second handover threshold from the first sector to the second sector in response to the second radio base station accepting the change request;
within the second radio base station after increasing the second handover threshold, resetting the change request and restoring an original value of the second handover threshold when the uplink interference of the first sector less than the first threshold is sustained for more than a predetermined time or when the usage rate of resource blocks in the first sector becomes higher than the second threshold; and
within the first radio base station, restoring an original value of the first handover threshold in response the change request being reset.

7. The interference equalization method according to claim 6, wherein the first threshold is higher than the third threshold while the second threshold is lower than the fourth threshold.

8. The interference equalization method according to claim 6, wherein an IoT is measured as the uplink interference.

9. The interference equalization method according to claim 6, wherein an SINR is measured as the uplink interference.

10. A non-transient computer-readable storage medium storing a program, executable with a computer, implementing an interface equalization method comprising:
measuring uplink interference and an usage rate of resource blocks in a first sector;
issuing a change request of a handover threshold in a second sector when the first sector is assigned to uplink interference equal to or above a first threshold and a usage rate of resource blocks equal to or below a second threshold;
measuring uplink interference and a usage rate of resource blocks in the second sector;
accepting the change request to decrease a first handover from the second sector to the first sector when the second sector is assigned to the uplink interference equal to or below a third threshold and the usage rate of resource blocks is equal to or above a fourth threshold;
increasing a second handover threshold from the first sector to the second sector in response to the change request being accepted;
after increasing the second handover threshold, resetting the change request and restoring an original value of the second handover threshold when the uplink interference of the first sector less than the first threshold is sustained for more than a predetermined time or when the usage rate of resource blocks in the first sector becomes higher than the second threshold; and
restoring an original value of the first handover threshold in response to the change request being reset.

* * * * *